(12) United States Patent
Balda Belzunegui et al.

(10) Patent No.: US 11,444,553 B2
(45) Date of Patent: Sep. 13, 2022

(54) ELECTRICAL POWER CONVERSION SYSTEM AND ASSOCIATED METHOD

(71) Applicant: INGETEAM POWER TECHNOLOGY, S.A., Zamudio (ES)

(72) Inventors: Julian Balda Belzunegui, Sarriguren (ES); Roberto Gonzalez Senosiain, Sarriguren (ES)

(73) Assignee: INGETEAM POWER TECHNOLOGY, SA, Zamudio (ES)

(*) Notice: Subject to any disclaimer, the term of this patent is extended or adjusted under 35 U.S.C. 154(b) by 0 days.

(21) Appl. No.: 16/969,044

(22) PCT Filed: Feb. 12, 2019

(86) PCT No.: PCT/ES2019/070072
§ 371 (c)(1),
(2) Date: Aug. 11, 2020

(87) PCT Pub. No.: WO2019/155109
PCT Pub. Date: Aug. 15, 2019

(65) Prior Publication Data
US 2021/0036626 A1    Feb. 4, 2021

(30) Foreign Application Priority Data
Feb. 12, 2018   (WO) ................ PCT/ES2018/070095

(51) Int. Cl.
*H02M 7/797*   (2006.01)
*H02M 7/48*   (2007.01)
(Continued)

(52) U.S. Cl.
CPC ......... *H02M 7/797* (2013.01); *H02M 7/4807* (2013.01); *H02J 2300/24* (2020.01); *H02M 5/297* (2013.01); *H02M 7/81* (2013.01)

(58) Field of Classification Search
CPC ........ H02M 7/497; H02M 7/66; H02M 7/797; H02M 7/81
See application file for complete search history.

(56) References Cited

U.S. PATENT DOCUMENTS 8,546,974 B2 * 10/2013 Foxall ..................... H02J 7/345
307/29
11,088,625 B1 * 8/2021 Cao ................... H02M 3/33584
(Continued)

FOREIGN PATENT DOCUMENTS

WO   2012/162581 A1   11/2012
WO   2019/155109 A1    8/2019

OTHER PUBLICATIONS

Ned Mohan, et al., "Overvoltage Snubber" In: "Power Electronics: Converters, Applications and Design", John Wiley and Sons, Inc. U.S.A., XP055575453, ISBN: 978-0-471-22693-2, pp. 686-688.
(Continued)

*Primary Examiner* — Sisay G Tiku
(74) *Attorney, Agent, or Firm* — Sughrue Mion, PLLC

(57) ABSTRACT

The invention relates to a conversion system (100) with a DC side and an AC side, and to an associated control method. The system (100) comprises a primary conversion block (1), a secondary conversion block (2) and a transformer block (3) with at least one primary winding (3.1) connected to the primary conversion block (1) and a secondary winding (3.2R, 3.2S, 3.2T) for each phase (R, S, T) which are connected to the secondary conversion block (2). Each conversion block (1, 2) comprises a plurality of controllable switches, and the system (100) comprises a controller (4) communicated with said switches and configured for causing the opening and closing of said switches in a controlled and coordinated manner.

27 Claims, 8 Drawing Sheets

(51) Int. Cl.
*H02M 7/81* (2006.01)
*H02M 7/497* (2007.01)
*H02M 7/66* (2006.01)
*H02M 5/297* (2006.01)

(56) References Cited

U.S. PATENT DOCUMENTS

| | | | |
|---|---|---|---|
| 2008/0037299 A1* | 2/2008 | Suzuki | H02M 7/4807 363/49 |
| 2008/0043506 A1* | 2/2008 | Ozaki | H02M 7/4807 363/131 |
| 2009/0196082 A1* | 8/2009 | Mazumder | H02M 5/458 363/132 |
| 2010/0072824 A1* | 3/2010 | Abolhassani | H02M 7/49 307/82 |
| 2010/0156188 A1 | 6/2010 | Fishman | |
| 2011/0280048 A1* | 11/2011 | Fujiyoshi | H02M 1/34 363/21.04 |
| 2012/0092898 A1* | 4/2012 | Raju | H02M 3/3376 363/17 |
| 2013/0049654 A1 | 2/2013 | Kure | |
| 2013/0314948 A1* | 11/2013 | Perreault | H02M 7/4807 363/8 |
| 2014/0160800 A1 | 6/2014 | Zimmanck | |
| 2016/0276964 A1* | 9/2016 | Zushi | B60L 58/21 |
| 2016/0352318 A1 | 12/2016 | Amit et al. | |
| 2017/0163043 A1* | 6/2017 | Garces | H02M 7/483 |
| 2018/0191236 A1* | 7/2018 | Wagoner | H02M 7/003 |
| 2019/0229625 A1* | 7/2019 | Jimichi | H02M 3/33507 |
| 2021/0119550 A1* | 4/2021 | Tsuruta | H02M 7/2173 |

OTHER PUBLICATIONS

International Search Report for PCT/ES2019/070072 dated May 13, 2019 [PCT/ISA/210].

Written Opinion for PCT/ES2019/070072 dated May 13, 2019 [PCT/ISA/237].

* cited by examiner

ELECTRICAL POWER CONVERSION SYSTEM AND ASSOCIATED METHOD

CROSS REFERENCE TO RELATED APPLICATIONS

This application is a National Stage of International Application No. PCT/ES2019/070072 filed Feb. 12, 2019, claiming priority based on Spanish Patent Application No. PCT/ES2018/070095 filed Feb. 12, 2018.

TECHNICAL FIELD

The present invention relates to electrical power conversion systems which are suitable for converting DC electrical power to AC electrical power and vice versa, and with methods of control associated with said systems.

PRIOR ART

The conversion of DC power to three-phase AC power in photovoltaic plants has historically been done by means of converters connected in low voltage conditions to the generator and a low-frequency transformer. In reference to the example shown in FIG. 1, relating to a photovoltaic plant, the power generated by the photovoltaic field 1' is clustered in junction boxes 2', a set of junction boxes 2' in parallel is connected to the DC input of at least one DC/AC converter 3', and said DC/AC converter 3' is connected to the low voltage side of a transformer 4', which raises the output voltage of the set 100' to a high voltage value, usually 20 to 33 kV to transport the AC power through an internal AC distribution grid 5' of the photovoltaic plant 1000', to the main transformer 6' which connects with the distribution grid. Several of these sets 100' are connected to the AC distribution grid 5'.

More recently, due to the increase in power of photovoltaic converters, the wiring distances resulting from connecting photovoltaic panels and converters have significantly increased, making it economically advantageous for converters to continue growing in power. Furthermore, there is another limiting factor for the power of the sets 100' resulting from the size of the low-frequency transformer 4' to which they are connected, since those transformers that cannot be placed in standard shipping containers will be subjected to substantial extra costs due to transport.

There are solutions for solving the problem with the cost of DC wiring and the transformer associated with the converter, and they consist on adding low-power DC/DC converters, along with photovoltaic generators, transporting the DC power in a high-voltage bus, to subsequently transform the DC power to AC power in a high-DC voltage/AC converter. With topologies of this type, the cost of the DC wiring is reduced by working with higher voltages and eliminating the intermediate high-to-low voltage transformer. In this case, the solutions proposed for the DC/AC converter consist of serial converters, whether they are three-phase converters connected in series to independent windings of transformers or converters single-phase.

US2010/0156188A1, for example, discloses a solution of this type. This solution has a double conversion as a drawback, a first DC/DC conversion to raise the DC voltage, and a second DC/AC conversion to thereby generate the AC power of the distribution grid.

US2016/0276964A1, for example, discloses a conversion system that allows reducing the DC wiring by connecting low-power converters close to the photovoltaic panels. These converters are serially connected to obtain the AC voltage of the plant distribution grid at high voltage levels. However, it has two drawbacks: it requires a double DC/DC and DC/AC conversion, and each DC/AC converter is single-phase, which makes it necessary to oversize the capacitors due to the power fluctuation that is twice the fundamental frequency of the single-phase systems.

In respect of isolated three-phase DC/AC converters, US2013/0314948A1 discloses an electrical power conversion system comprising an inverter, a cycloconverter and a transformer connected between the inverter and the cycloconverter. The cycloconverter comprises a secondary sub-block per phase, each one with a respective output port, and the transformer comprises one respective secondary winding for each secondary sub-block. Each secondary sub-block comprises a plurality of controllable switches and at least one controller, said controller being configured to control said controllable switches to provide a phase-shift between a resonant AC current and a voltage switching function based, at least in part, on a sign of an applied voltage at a corresponding cycloconverter output port. The arrangement of the switches has been done considering said control requirements, and consequently, it is limited to some control strategies only.

DISCLOSURE OF THE INVENTION

The object of the invention is to provide an electrical power conversion system configured for converting DC power to three-phase AC power and vice versa, and an associated control method, as defined in the claims.

One aspect of the invention relates to an electrical power conversion system configured for converting DC power to three-phase AC power and vice versa. To that end, the system comprises a DC side with a positive terminal and a negative terminal, and an AC side for the connection thereof to a three-phase power grid, with a first terminal and a second terminal for each of the three phases.

The system further comprises a primary conversion block, a secondary conversion block and a transformer block comprising at least one primary winding connected to the primary conversion block and three secondary windings connected to the secondary conversion block, each secondary winding being associated with a respective AC phase. The transformer block comprises at least one transformer, such that it allows increasing or decreasing the voltage, maintaining the power.

The primary conversion block comprises the two terminals of the DC side of the system, and a plurality of controllable switches to enable controlling the flow of electrical power between said terminals and the transformer block.

The secondary conversion block comprises the first terminal and the second terminal associated with each AC phase, and a plurality of controllable switches associated with each phase to enable controlling the flow of electrical power, in each case, between the corresponding terminals and the transformer block.

The conversion blocks must work in a coordinated manner to obtain the desired conversion. In that sense, for example, to obtain voltage in one of the AC phases, a given voltage must be applied in the primary block (positive or negative) and the switches of the secondary conversion block must be coordinated in order to apply the corresponding phase voltage.

The system further comprises a controller which is communicated with the controllable switches of both conversion blocks and is configured for causing the opening and closing of said switches in a controlled and coordinated manner, to perform power conversion.

A system which, with galvanic isolation between the DC side and the AC side (by means of the transformer block), provides a single DC/AC conversion (or AC/DC conversion, depending on the direction) is thereby obtained. Furthermore, since there is only one conversion, the system requires a smaller capacity than in the prior art, as no capacitor is required (beyond the capacitor between the terminals of the DC side, in any case), which furthermore contributes to eliminating fluctuations in single-phase power.

In this system, the coordinated work of the conversion blocks allows the transformer to work at a higher frequency than that of the grid, reducing their size and cost with respect to the transformers used in the prior art.

The secondary conversion block comprises a respective secondary sub-block for each of the phases, each secondary sub-block comprising a first terminal and a second terminal for the corresponding phase and a plurality of controllable switches communicated with the controller. Each secondary sub-block is electrically connected to a respective secondary winding of the transformer block, each of the secondary windings of the transformer block comprising a first end electrically connected to the first terminal of the corresponding secondary sub-block and a second end electrically connected to the second terminal of said corresponding secondary sub-block.

Each secondary sub-block comprises a first switching block which is electrically connected to the corresponding secondary winding of the transformer block and to at least one of the terminals of said secondary sub-block, and a second switching block. The first switching block comprises at least one controllable switch communicated with the controller, and the second switching block comprises at least one controllable switch communicated with the controller.

The second switching block is directly connected between the two terminals of said secondary sub-block, said second switching block comprising a first end directly connected to the first terminal of said secondary sub-block and a second end that is directly connected to the second terminal of said secondary sub-block.

According to the invention, a "direct connection" (and "directly connected") must be interpreted as a connection limited to a direct connection between two points not through any other component or element arranged between said two points.

With said configuration of the secondary sub-blocks, a more flexible system is obtained which allows, for example, more options for its control and a more flexibility when designing the system itself.

Another aspect of the invention relates to a control method for a system according to the preceding aspect of the invention. In the method, the controllable switches of the two conversion blocks of the system are controlled by means of the controller of said system for converting DC power to AC power or for converting three-phase AC power to DC power. The mentioned advantages for the system are obtained with the method.

Another aspect of the invention relates to an electrical power conversion installation, comprising a plurality of conversion systems according to the first aspect of the invention, said systems being connected in series. The three first terminals of the conversion block secondary of the first system are star-connected to one another, and the first terminal associated with each AC phase of the rest of the systems are connected to the second terminal of the corresponding phase of the preceding system. The described advantages for the system are also obtained with the installation, and, in addition, a high-voltage installation is also achieved.

These and other advantages and features of the invention will become evident in view of the drawings and detailed description of the invention.

DETAILED DISCLOSURE OF THE INVENTION

Figure 1:
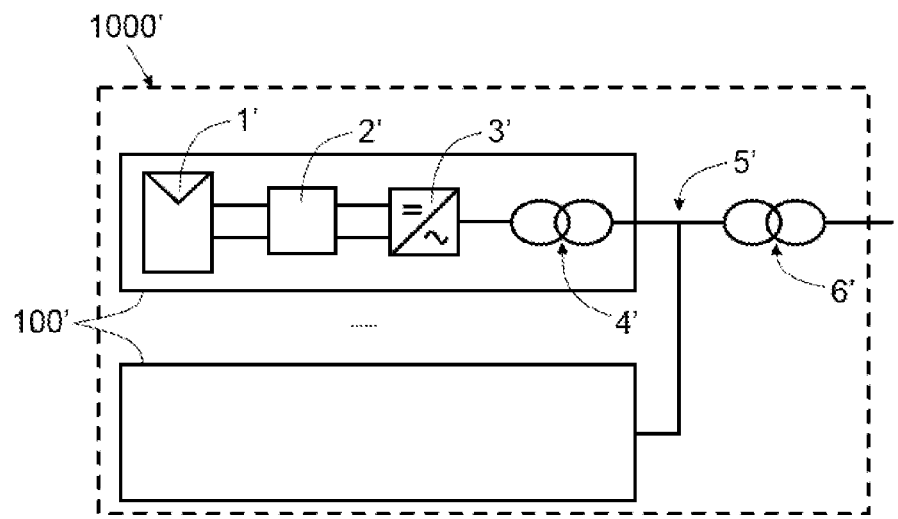
FIG. 1 schematically shows a photovoltaic plant of the prior art.
Figure 2:
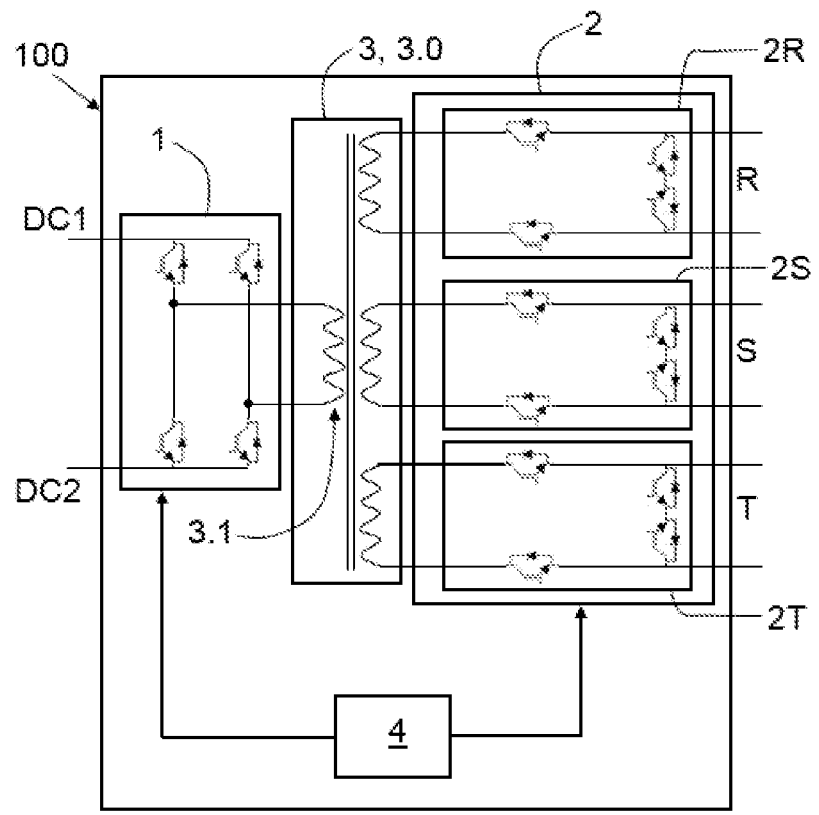
FIG. 2 schematically shows an embodiment of the electrical power conversion system of the invention.

One aspect of the invention relates to an electrical power conversion system 100, such as the shown by way of example in FIG. 2, which is configured for converting DC power to AC three-phase R, S and T power and vice versa, and comprises a DC side with a positive terminal DC1 and a negative terminal DC2, and an AC side with a first terminal and a second terminal for each of the AC three phases R, S and T.

To make the conversion, the system 100 comprises a primary conversion block 1, a secondary conversion block 2, and a transformer block 3 providing galvanic isolation between the two conversion blocks 1 and 2, and comprising at least one primary winding 3.1 connected to the primary conversion block 1 and three secondary windings 3.2R, 3.2S and 3.2T connected to the secondary conversion block 2, each secondary winding 3.2R, 3.2S and 3.2T being associated with a respective AC phase R, S and T.

The primary conversion block 1 comprises the two terminals DC1 and DC2 of the DC side of the system 100, and a plurality of controllable switches to enable controlling the flow of electrical power between said terminals DC1 and DC2 and the transformer block 3. The primary conversion block 1 preferably comprises a complete bridge topology, but it could comprise any other DC/AC topology, such as a half-bridge or multi-level bridge topology, for example.

In turn, the secondary conversion block 2 comprises the first terminal and the second terminal of the AC side per AC phase R, S and T of the system 100 (six terminals in total), and a plurality of controllable switches associated with each phase R, S and T to enable controlling the flow of electrical power, in each case, between the corresponding terminals and the transformer block 3.

The controllable switches of the two conversion blocks 1 and 2 are preferably of the IGBT-type with an anti-parallel diode, but they could be of the MOSFET-type, IGCT-type, GTO-type or any other equivalent type.

The system 100 further comprises a controller 4 which is communicated with the controllable switches of the two conversion blocks 1 and 2 and is configured for causing the opening and closing of said switches in a controlled and coordinated manner to perform power conversion as required.

The secondary conversion block 2 comprises a secondary sub-block 2R, 2S and 2T for each of the AC phases R, S and T. Each secondary sub-block 2R, 2S and 2T comprises the first terminal and the respective second terminal for the corresponding AC phase R, S and T, and a plurality of controllable switches communicated with the controller 4. Having two terminals for each phase R, S and T allows connecting the system 100 to another system 100, preferably in series, in which case one terminal is used as the input terminal and the other terminal is used as the output terminal, as will be described in detail below, although they could also be connected in parallel.

Each secondary sub-block 2R, 2S and 2T is connected to a respective secondary winding 3.2R, 3.2S and 3.2T of the transformer block 3. Each of said secondary windings 3.2R, 3.2S and 3.2T comprises a first end connected to the first terminal of the corresponding secondary sub-block 2R, 2S and 2T and a second end connected to the second terminal of said corresponding secondary sub-block 2R, 2S and 2T, directly or through at least one corresponding controllable switch as described in detail below.

Each secondary sub-block 2R, 2S and 2T further comprises a first respective switching block 1MS, which is connected to the corresponding secondary winding 3.2R, 3.2S and 3.2T of the transformer block 3 and to at least one of the terminals of said secondary sub-block 2R, 2S and 2T and comprises at least one of the controllable switches communicated with the controller 4; and a second respective switching block 2MS, which is directly connected between the two terminals of the corresponding sub-block 2R, 2S and 2T and comprises the rest of controllable switches communicated with the controller 4 of said secondary sub-block 2R, 2S and 2T.

As also described before, according to the invention a "direct connection" (and "directly connected") must be interpreted as a connection limited to a direct connection between two points not through any other component or element arranged between said two points. Such a connection can be seen in Figures, between the second switching block 2MS and the two terminals of the corresponding sub-block 2R, 2S and 2T for example.

The first switching block 1MS can comprise a configuration selected at least between:
 a first configuration in which the first switching block 1MS comprises a first controllable switch T1R with an antiparallel diode, connected between the first end of the corresponding secondary winding 3.2R, 3.2S and 3.2T of the transformer block 3 and the first terminal of the corresponding secondary sub-block 2R, 2S and 2T, and a second controllable switch T4R with an antiparallel diode, connected between the second end of the corresponding secondary winding 3.2R, 3.2S and 3.2T of said transformer block 3 and the second terminal of the corresponding secondary sub-block 2R, 2S and 2T (configuration shown in FIG. 3*a*),
 a second configuration in which the first switching block 1MS comprises a bi-directional switch with antiparallel diodes, connected between the first end of the corresponding secondary winding 3.2R, 3.2S and 3.2T of the transformer block 3 and the first terminal of said secondary sub-block 2R, 2S and 2T (configuration shown in FIG. 3*b*), and
 a third configuration in which the first switching block 1MS comprises a bi-directional switch with antiparallel diodes, connected between the second end of the corresponding secondary winding 3.2R, 3.2S and 3.2T of the transformer block 3 and the second terminal of said secondary sub-block 2R, 2S and 2T (configuration not shown in the figures).

The second switching block 2MS, in turn, comprises a configuration selected at least between a first configuration in which it comprises a bi-directional switch with antiparallel diodes, or a second configuration in which it comprises two switches T2R and T3R connected in anti-series in a connection midpoint 2MSM, as shown in Figures, each switch T2R and T3R comprising an antiparallel diode.

Different combinations of the configurations of the first switching block 1MS and the second switching block 2MS are possible. Some embodiments of the system 100 can comprise first switching blocks 1MS with the first configuration and second switching blocks 2MS with the first configuration; other embodiments of the system 100 can comprise first switching blocks 1MS with the first configuration and second switching blocks 2MS with the second or third configuration; other embodiments of the system 100 can comprise first switching blocks 1MS with the second configuration and second switching blocks 2MS with the first configuration; and other embodiments of the system 100 can comprise first switching blocks 1MS with the second configuration and second switching blocks 2MS with the second or third configuration.

Therefore, as a result of the two switching blocks 1MS and 2MS of each secondary sub-converter 2R, 2S and 2T, the terminals of each of said secondary sub-converters 2R, 2S and 2T can be connected to the corresponding secondary winding 3.2R, 3.2S and 3.2T of the transformer block 3 when and as required to perform power conversion. Said terminals can be short-circuited and disconnected from the corresponding secondary winding 3.2R, 3.2S and 3.2T when conversion is not desired (when voltage between said terminals is not desired) by means of the second switching block 2MS. So, as a result of that flexibility, control of the active and reactive power in the four quadrants can be provided.

Thus, with the proposed configuration a more flexible system is obtained which allows, for example, more options for its control and a more flexibility when designing the system itself, it not being limited to specific control strategies as occurs in the system described in the prior art.

As described, by means of the corresponding second switching block 2MS, the terminals of a secondary sub-converter 2R, 2S or 2T are short-circuited. Said short-circuit would not be possible without a direct connection between said second switching block 2MS and said terminals. Consequently, the voltage between said terminals is assured to be null when desired, in contrast with the system described in US2013/0314948A1. Therefore, when controlling the system, it is possible to guarantee this null voltage when desired, said option being easily achieved with said proposed configuration.

Furthermore, with the proposed different possible combinations of the system an effect over the corresponding secondary winding 3.2R, 3.2S or 3.2T of the transformer block 3 due to said short-circuit can also be prevented, by means of the corresponding first switching block 1MS (if the controllable switch (or switches) is open). Therefore, said combinations allow the short-circuit of the terminals of any of the secondary sub-converter 2R, 2S or 2T not to be reflected in the transformer block 3, and the configuration of the primary of the transformer block 3 can also be designed without considering said situations in its secondary. In the system described in US2013/0314948A1, the short-circuit of the terminals of any secondary sub-converter implies the short-circuit between the two ends of the corresponding secondary winding of the transformer, and, therefore, the configuration of the primary of the transformer cannot be designed without considering said situations in its secondary. Consequently, the proposed different possible combinations in the invention allow more flexibility when designing the system itself.

Preferably, each secondary sub-block 2R, 2S and 2T comprises at least one respective discharging circuit 2RD; 2RD' configured for providing an electrical path for a current passing through the corresponding secondary sub-block 2R, 2S and 2T from a terminal of said secondary sub-block 2R, 2S and 2T to the other terminal of said secondary sub-block 2R, 2S and 2T, for protecting the controllable switch (or switches) of the first switching block 1MS and/or of the second switching block 2MS, said electrical path not including any of the controllable switch included in 1MS and/or 2MS.

When the state of a controllable switch of any of the switching blocks 1MS or 2MS is going to be changed, specially from closed state to open state, there is a risk of generating an overvoltage between the ends of said controllable switch, which could derive in the damage of said switch as a result. This effect could be dangerous in the controllable switches of the first switching block 1MS due to the parasitic inductances related to the transformer block 3 and the parasitic inductances related to the wires of the secondary sub-blocks 2R, 2S and 2T, and in the controllable switches of the second switching block 2MS due to the corresponding wires and the possible inductances of an output filter connected to the terminals of the corresponding secondary sub-block 2R, 2S and 2T. Due to said inductances, when any of the controllable switches (or switch) of the first switching block 1MS and any of the controllable switches (or switch) of the second switching block 2MS is changing its state from closed state to open state, a transient voltage is generated that could damage said controllable switch.

Thanks to the corresponding discharging circuit 2RD; 2RD', despite said controllable switch is open the current finds another path for flowing, and the voltage generated between both terminals of the controllable switch during said switching, due to parasitic inductances, is prevented from achieving a value that could damage said switch. Therefore, the discharging circuit 2RD provides a safety function for the controllable switches of the first switching block 1MS and/or for the controllable switches of the second switching block 2MS, a more reliable and robust system being obtained.

The discharging circuit 2RD; 2RD' can be passive or active, and, if the system 100 comprises more than one discharge circuits 2RD; 2RD', preferably all of them are of the same type (passive or active).

The following explanations regarding to the discharge circuit 2RD; 2RD' are given for one secondary sub-block 2R, 2S and 2T for the sake of clarity, but it has to be noted that all the secondary sub-blocks 2R, 2S and 2T can comprise a discharge circuit 2RD; 2RD', or only one or two of them.

Figure 3A:
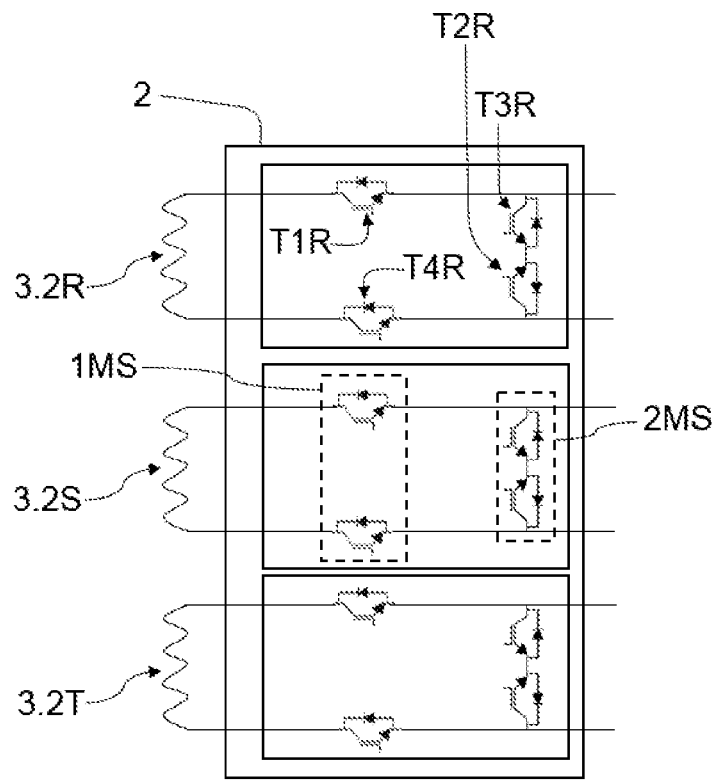
FIG. 3*a* shows in further detail a secondary conversion block of the system of FIG. 2, connected to the secondary winding of the transformer block of said system.
Figure 3B:
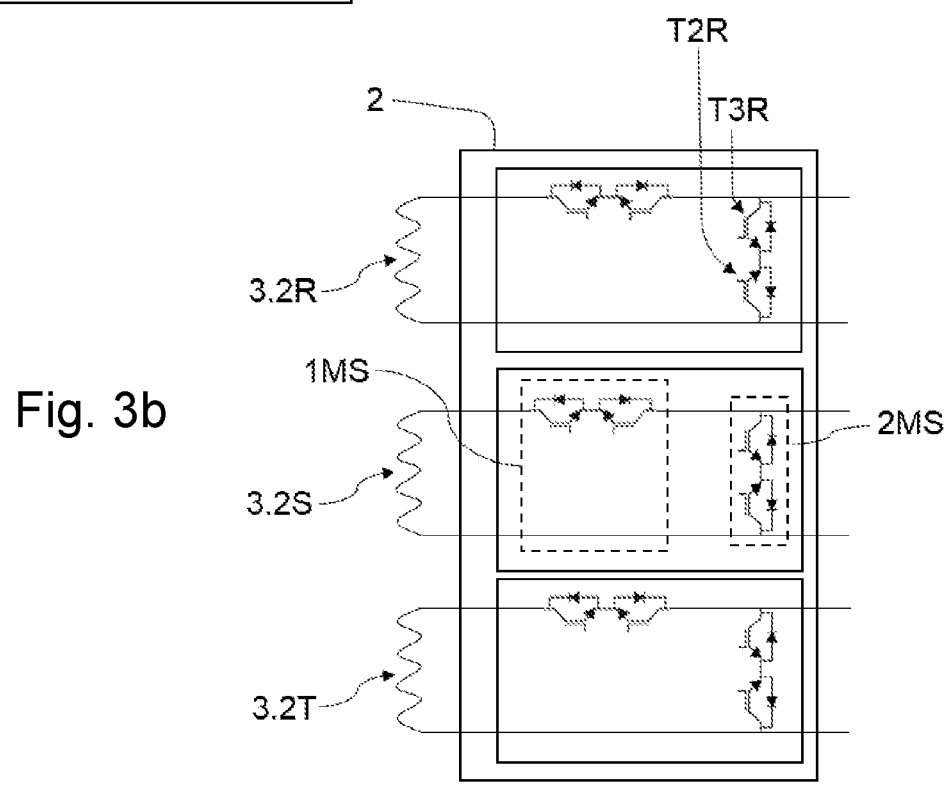
FIG. 3*b* shows a secondary conversion block of another embodiment of the system of the invention, connected to the secondary winding of the transformer block of said system.

In some embodiments, the discharging circuit 2RD; 2RD' is configured at least for protecting the switches of the first switching block 1MS, when said first switching block 1MS comprises the first configuration. In said configuration, said first switching block 1MS comprises two controllable switches T1R and T4R as shown in FIG. 3a for example.

Figure 9A:
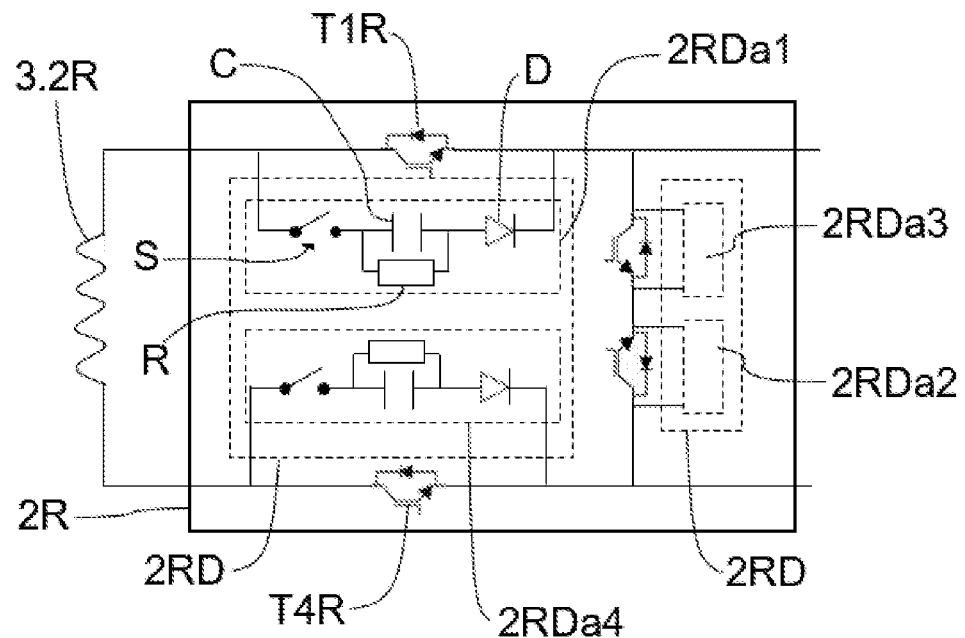
FIG. 9*a* schematically shows a secondary sub-block of an embodiment of an electrical power conversion system according to the invention, comprising a discharging circuit.

In case of an active discharging circuit 2RD, as the one shown in FIG. 9a, for example, the discharging circuit 2RD comprises a discharging sub-circuit connected in parallel to the controllable switch to be protected. Preferably, the discharging circuit 2RD comprises a first discharging sub-circuit 2RDa1 connected in parallel to the first controllable switch T1R and a second discharging sub-circuit 2RDa4 connected in parallel to the second controllable switch T4R, as shown in FIG. 9a.

In some embodiments, the discharging circuit 2RD; 2RD' is configured at least for protecting the switches of the second switching block 2MS, when said second switching block 2MS comprises the second configuration. In said configuration, said second switching block 2MS comprises two controllable switches T2R and T3R as shown in FIG. 3a for example.

In case of an active discharging circuit 2RD, as the one shown in FIG. 9a, for example, the discharging circuit 2RD comprises a discharging sub-circuit connected in parallel to the controllable switch to be protected. Preferably, the discharging circuit 2RD comprises a first discharging sub-circuit 2RDa2 connected in parallel to the switch T2R and a second discharging sub-circuit 2RDa3 connected in parallel to the switch T3R, as shown in the embodiment shown in FIG. 9a.

Preferably, the first switching block 1MS is configured with the first configuration, and the second switching block 2MS is configured with the second configuration; and the system 100 comprises a respective active discharging sub-circuit 2RDa1 to 2RDa4 for each one of the controllable switches T1R to T4R of the switching blocks 1MS and 2MS.

Other combinations and/or configurations are also possible for other embodiments of the system 100 including active discharging circuits 2RD.

Each discharging sub-circuit 2RDa1 to 2RDa4 of the system 100 comprises preferably a discharging switch S, a capacitor C and a diode D in series connection, and a resistor R connected in parallel with the capacitor C. Therefore, each controllable switch comprising a discharging sub-circuit 2RDa1 connected in parallel comprises an associated discharging switch S. The controller 4 is communicated with all the discharging switches S of the system 100 and is configured for synchronously controlling a discharging switch S and its associated controllable switch T1R to T4R, in such a way that a discharging switch S is closed at the same time as its associated controllable switch T1R to T4R, but it is open with a delay in respect of said controllable switch T1R to T4R. Said delay allows the current to flow through it when the associated controllable switch T1R to T4R is opened, during the delay time, and overvoltage in terminals of said controllable switch T1R to T4R is so avoided. The value of the delay can be predetermined as required.

Figure 9B:
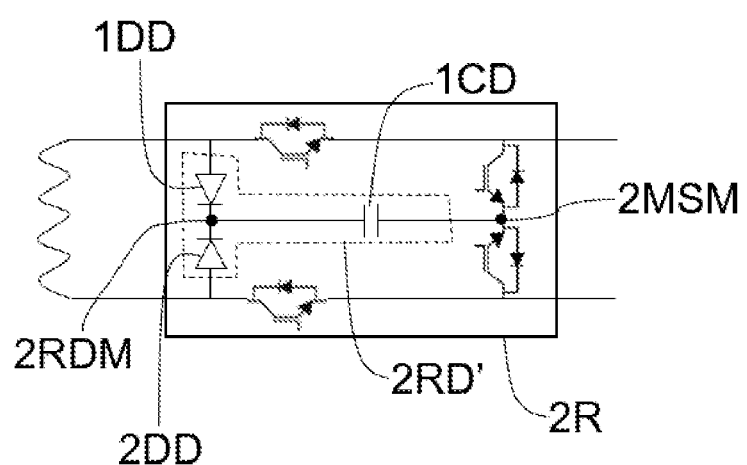
FIG. 9*b* schematically shows a secondary sub-block of another embodiment of an electrical power conversion system according to the invention, comprising a discharging circuit.

In other embodiments, as the one related to the secondary sub-block 2R shown in FIG. 9b, the discharging circuit 2RD' is a passive discharging circuit. Preferably, each passive discharging circuit 2RD' comprises a first diode 1DD for the first switch T1R of the first switching block 1MS and a second diode 2DD for the second switch T2R of the second switching block 2MS, both diodes 1DD and 2DD being directly connected in a connection point 2RDM and forming a branch connected in parallel to the corresponding secondary winding 3.2R, 3.2S or 3.2T of the transformer block 3. The anode of each diode 1DD and 2DD is directly connected to the collector or drain of the corresponding switch T1R and T4R, and the cathode of both diodes 1DD and 2DD are directly connected to each other in the connection point 2RDM. Each discharging circuit 2RD' further comprises a capacitor 1CD comprising a first end connected to the connection point 2RDM and a second end directly connected to the second switching block 2MS, in particular to the connection midpoint 2MSM of the second switching block 2MS. Therefore, when a switch T1R or T4R is changing from closed state to open state the current flows through the corresponding diode 1DD or 2DD, the capacitor 1CD and an antiparallel diode of the second switch block 2MS. The current flows from one terminal of the secondary sub-block 2R, 2S and 2T to the other terminal of said secondary sub-block 2R, 2S and 2T, and, depending the direction of the current, it flows through one or another antiparallel diode of the second switching block 2MS.

In some embodiments of the system 100, as the one shown in FIG. 2, the transformer block 3 comprises a single transformer 3.0 with a primary winding 3.1 and three secondary windings 3.2R, 3.2S and 3.2T. All the secondary windings 3.2R, 3.2S and 3.2T preferably comprise the same number of turns, and the turns ratio between the primary winding and the secondary windings will depend on the conversion.

Figure 4:
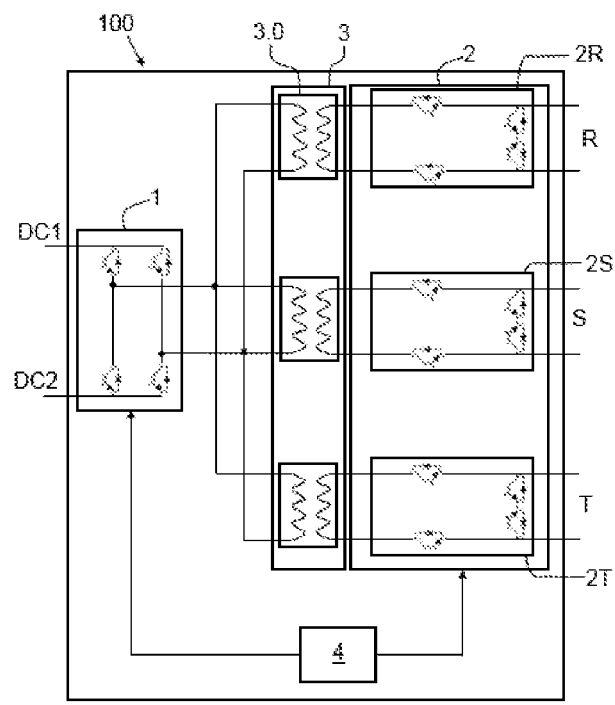
FIG. 4 schematically shows another embodiment of the electrical power conversion system of the invention.

In other embodiments of the system 100, like the shown by way of example in FIG. 4, the transformer block 3 comprises three transformers 3.0, each of them comprising a primary winding 3.1 connected to the primary conversion block 1 and a secondary winding 3.2R, 3.2S and 3.2T connected to the secondary conversion block 2. In contrast with the system described in US2013/0314948A1, where if a plurality of primary windings are present they are connected in series, the primary windings 3.1 of the proposed system 100 are connected to one another in parallel, and they preferably comprise the same number of turns. This fact is possible thanks to the configuration of the secondary sub-block 2R, 2S and 2T, and specially to the configuration and arrangement of the switching blocks 1MS and 2MS (in any of the possible combinations described before), which allows to short-circuit the terminals of said secondary sub-blocks 2R, 2S and 2T without it affecting the secondary windings 3.2R, 3.2S and 3.2T of the transformer block 3. Thus, said short-circuit is not reflected in the primary of the transformer block 3, and said primary can be designed as desired or as required without the limitations of the system described in US2013/0314948A1. Each of the secondary windings 3.2R, 3.2S and 3.2T is associated with a respective phase R, S, and T (connected to a respective secondary sub-block 2R, 2S and 2T), and they preferably comprise the same number of turns. The turns ratio between the primary windings 3.1 and the secondary windings 3.2R, 3.2S and 3.2T will depend on conversion requirements.

Figure 5:
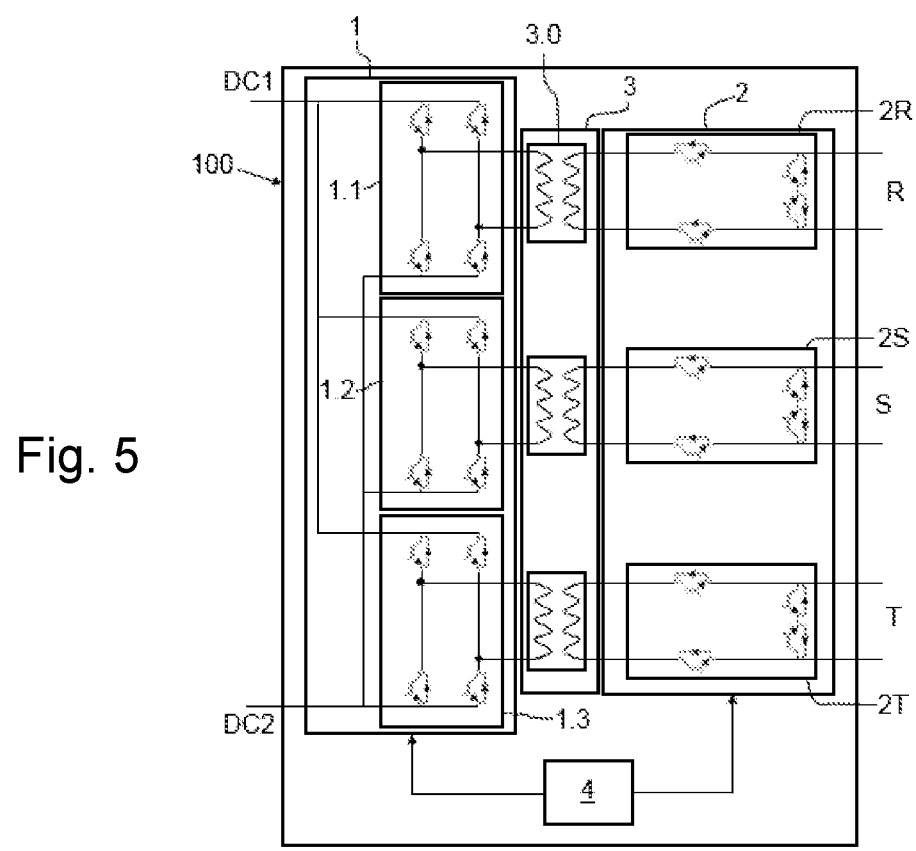
FIG. 5 schematically shows another embodiment of the electrical power conversion system of the invention

In other embodiments like the one shown by way of example in FIG. 5, the transformer block 3 comprises three transformers 3.0, each of them comprising a primary winding 3.1 connected to the primary conversion block 1 and a secondary winding 3.2R, 3.2S and 3.2T connected to the secondary conversion block 2, and the primary conversion block 1 comprises three conversion sub-blocks 1.1, 1.2 and 1.3, each of them connected to a corresponding primary winding 3.1. Each sub-conversion block 1.1, 1.2 and 1.3 comprises a positive terminal and a negative terminal by means of which said conversion sub-blocks 1.1, 1.2 and 1.3 are connected to one another in parallel.

It has to be noted also that, generally speaking, the configuration of the secondary sub-block 2R, 2S and 2T, in any of the possible combinations described before, also allows the transformer block 3 to comprise a number of primary windings 3.1 equal to the number of primary ports of the system 100, a primary port being coupled to the primary conversion block 1 to receive the AC voltage from said primary conversion block 1. All the primary ports are connected such that they are configured for receiving the same AC voltage from said primary conversion block 1, that is, they are connected in parallel (in contrast to the system described in US2013/0314948A1).

The system 100 is particularly advantageous in photovoltaic applications, in which a system 100 as described, in any of its embodiments or configurations, is connected to at least one photovoltaic generator 1001 coupled in the terminals DC1 and DC2 of the DC side. The generator 1001 generates DC power between the terminals DC1 and DC2 which the system 100 converts to three-phase AC power.

Another aspect of the invention relates to a control method suitable for being implemented in a system 100 like the one discussed for the first aspect of the invention (in any of its configurations and/or embodiments). The controlled and coordinated opening and closing of the controllable switches of the two conversion blocks 1 and 2 of said system 100 is caused with the method, by means of the controller 4 of said system 100, for converting DC electrical power to AC electrical power or vice versa.

Figure 6A:
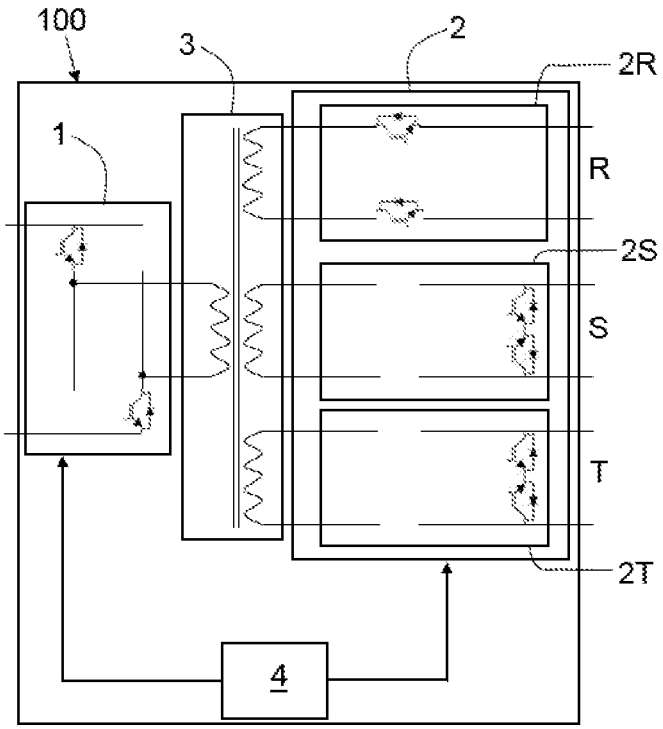
FIG. 6*a* shows the state of the switches of the conversion blocks of the system of FIG. 2, to obtain a positive voltage in phase R and a voltage equal to zero in phases S and T.
Figure 6B:
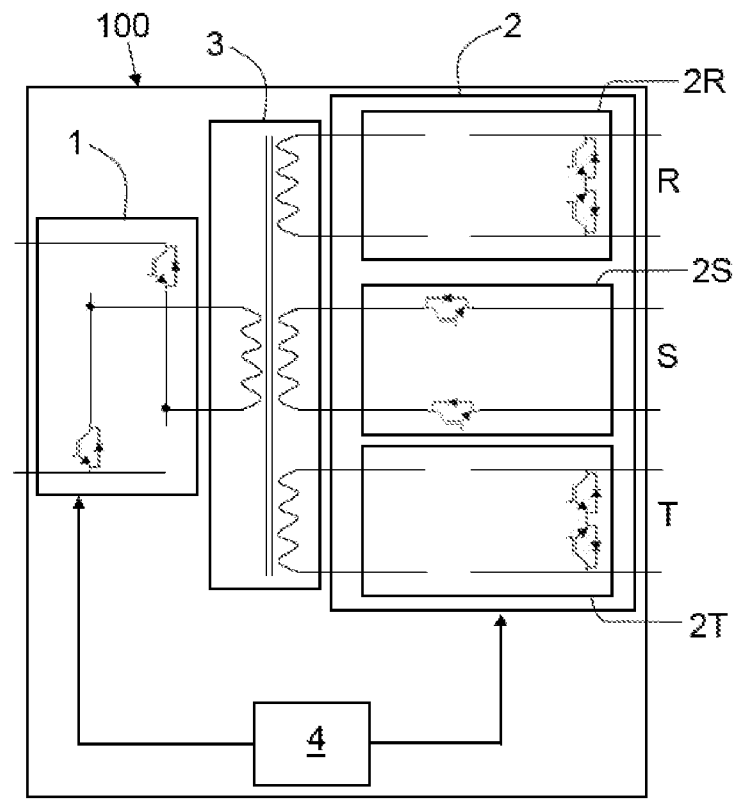
FIG. 6*b* shows the state of the switches of the conversion blocks of the system of FIG. 2, to obtain a negative voltage in phase S and a voltage equal to zero in phases R and T.

In the method:
  as depicted in the sequence shown in FIG. 6a, where the switches are kept closed, and open switches have been eliminated, with respect to FIG. 2, and wherein the positive voltage corresponds to phase R, with the voltage being equal to zero in phases S and T, in order to have a positive voltage in one phase (explained with respect to phase R): positive voltage is applied to the primary winding 3.1 of the transformer block 3, the closing of the switch, or switches, of the first switching block 1MS of the secondary sub-block 2R is caused, and the opening of the switch, or switches, of the second switching block 2MS of said secondary sub-block 2R is caused. The rest of the phases do not transfer power to the output, opening the first switching blocks 1MS and closing the corresponding second switching blocks 2MS.

as depicted in the sequence shown in FIG. 6b, where the switches are kept closed, and open switches have been eliminated, with respect to FIG. 2, and wherein the negative voltage corresponds to phase S, with the voltage being equal to zero in phases R and T, in order to have a negative voltage in one phase (explained with respect to phase S): negative voltage is applied to the primary winding 3.1 of the transformer block 3, the closing of the first switching block 1MS of the secondary sub-block 2S is caused, and the opening of the switch, or switches, of the second switching block 2MS of said secondary sub-block 2S is caused. The rest of the phases do not transfer power to the output, opening the first switching blocks 1MS and closing the second corresponding switching blocks 2MS.

Figure 6C:
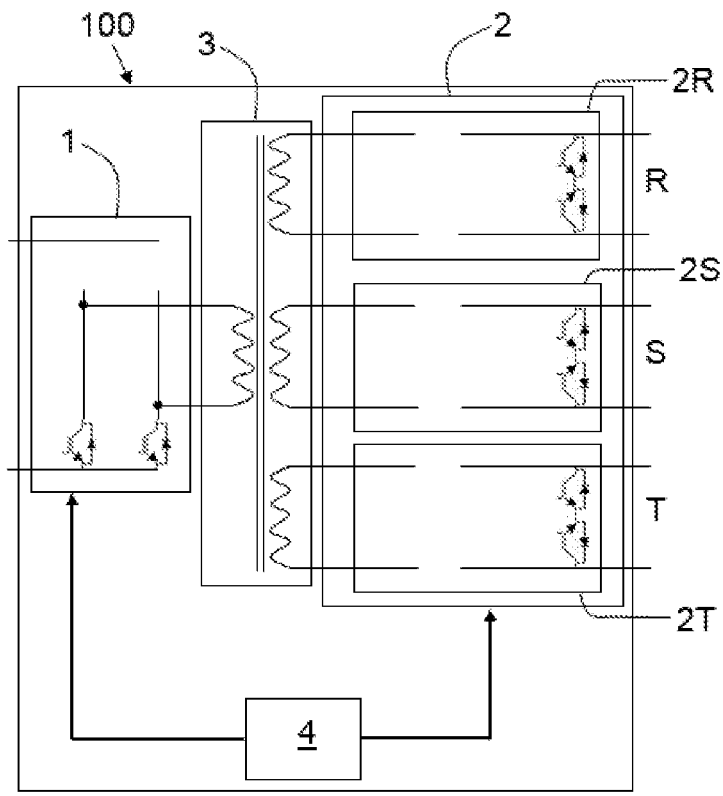
FIG. 6*c* shows the state of the switches of the conversion blocks of the system of FIG. 2, to obtain a voltage equal to zero in the three AC phases.

In order to have a voltage equal to zero (sequence shown in FIG. 6c, where the switches are kept closed, and open switches have been eliminated, with respect to FIG. 2, where the voltage is equal to zero in the three phases R, S and T): the opening of the switch, or switches, of the first switching block 1MS of the secondary sub-block 2R, 2S and 2T is caused, and the closing of the switch, or switches, of the second switching block 2MS of said secondary sub-block 2R, 2S and 2T is caused.

The controller 4 of the system 100 is therefore configured for acting on the controllable switches of both conversion blocks 1 and 2 in a controlled and coordinated manner, in order to comply with these considerations.

Furthermore, and as a result of the configuration of blocks 1, 2 and 3 of the system 100, to perform the conversion, in some embodiments the controller 4 is configured for carrying out a first control technique which is described in detail below, and in other embodiments said controller 4 is configured for carrying out a second control technique which is described in detail later, saturation of the transformer being prevented in both cases. Both control techniques entail a coordinated control over the controllable switches of the two conversion blocks 1 and 2.

First control technique (explained with respect to a DC conversion into three-phase AC):

In this control technique, converting DC power to AC power is done by means of time periods H, wherein three sequential sub-periods H1, H2 and H3 are established for each time period H, each phase R, S and T comprising an associated sub-period H1, H2 and H3. In each of the sub-periods H1, H2 and H3, a voltage with a positive or negative sign is applied in the primary winding 3.1 of the transformer block 3, according to the required sign of the voltage of the secondary winding 3.2R, 3.2S and 3.2T of the secondary sub-block 2R, 2S and 2T corresponding to sub-period H1, H2 and H3. In each sub-period H1, H2 and H3, the time in which the voltage is applied in the primary winding 3.1 of the transformer block 3 is such that the mean value of the resulting voltage in the corresponding secondary sub-block 2R, 2S and 2T in one period H is the mean value required by the control for that time period H and that phase R, S or T. The mean value of the voltage applied to the primary winding 3.1 of the transformer block 3 is equal to zero in each time period H to prevent saturation of the transformer block 3.

Figure 7:
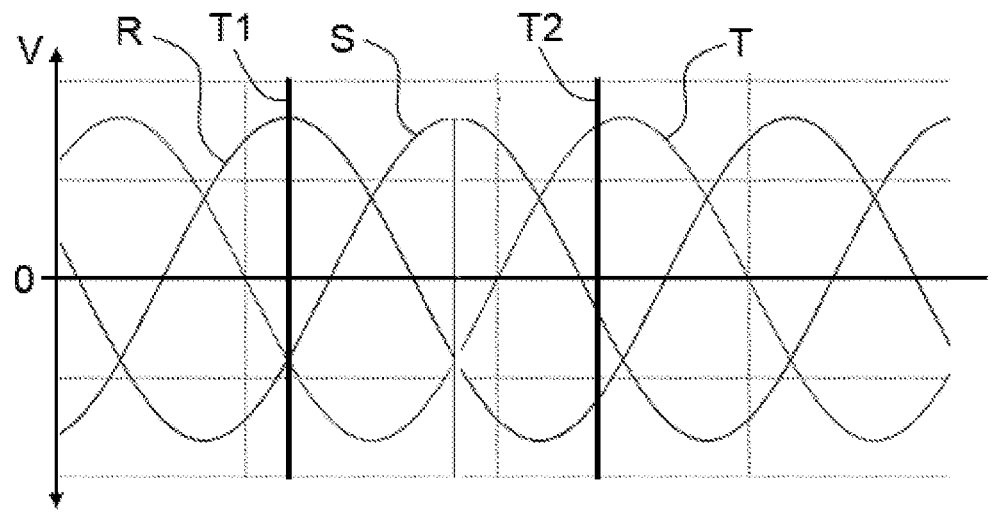
FIG. 7 shows the three-phase AC voltage at the output of the system of FIG. 2, when a DC voltage is converted to three-phase AC voltage.

In reference to the time instant T1 shown in FIG. 7, by way of example, in said time instant T1 the voltage of phase R comprises its maximum value, whereas the voltages of phases S and T comprise a negative value. To generate said voltages in said time instant T1 with said first control technique and as graphically shown in FIG. 8a, the controller 4 is configured for acting on the controllable switches such that:

in sub-period H1, a positive voltage is applied to the primary winding 3.1 of the transformer block 3, the closing of the switch, or switches, of the first switching block of the secondary sub-block 2R is caused, and the opening of the switch, or switches, of the second switching block of said secondary sub-block 2R is caused. The rest of the phases do not transfer power to the output, opening the first switching blocks 1MS and closing the second corresponding switching blocks 2MS (case of FIG. 6a);

in sub-period H2, a negative voltage is applied to the primary winding 3.1 of the transformer block 3, the closing of the switch, or switches, of the first switching block 1MS of the secondary sub-block 2S is caused, and the opening of the switch, or switches, of the second switching block 2MS of said secondary sub-block 2S is caused. The rest of the phases do not transfer power to the output, opening the first switching blocks 1MS and closing the second corresponding switching blocks 2MS (case of FIG. 6b); and in sub-period H3, a negative voltage is applied to the primary winding 3.1 of the transformer block 3, the closing of the switch, or switches, of the first switching block of the secondary sub-block 2T is caused, and the opening of the switch, or switches, of the second switching block of said secondary sub-block 2T is caused. The rest of the phases do not transfer power to the output, opening the first switching blocks 1MS and closing the second corresponding switching blocks 2MS (case not shown in the figures).

In each sub-period H1, H2 and H3, the time in the which the voltage is applied in the primary winding 3.1 of the transformer block 3 is such that the mean value of the resulting voltage in the secondary winding 3.2R, 3.2S, 3.2T in one time period H is the mean value required by the control for that time period H and that phase R, S or T. The mean value of the voltage applied to the primary winding 3.1 of the transformer block 3 is equal to zero in each time period H to prevent saturation of the transformer block 3.

Figure 8A:
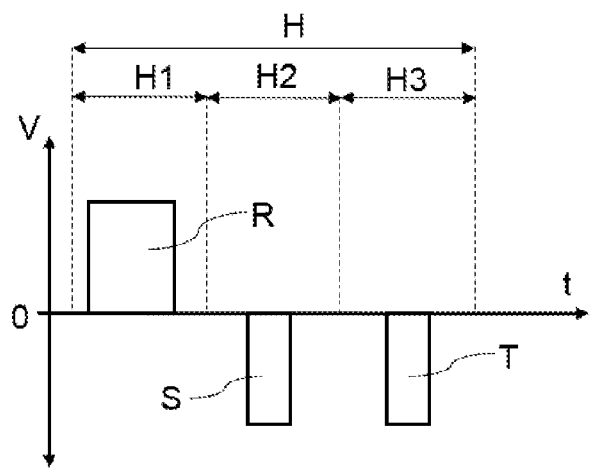
FIG. 8*a* shows a depiction of a discrete time according to a first control technique to be applied in the system of FIG. 2, to obtain the instantaneous voltages at point T1 of FIG. 7.
Figure 8B:
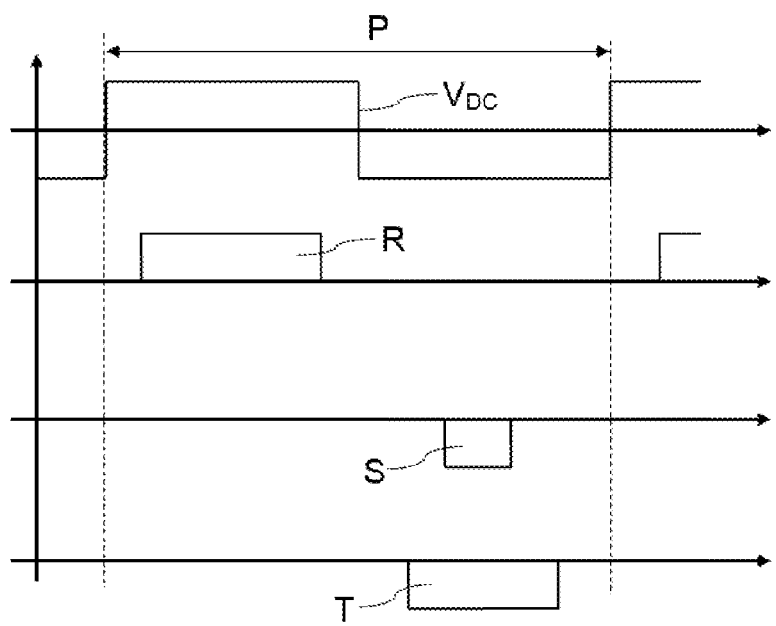
FIG. 8*b* shows a depiction of a given period according to a second control technique to be applied in the system of FIG. 2, to obtain the instantaneous voltages at point T2 of FIG. 7.

The duration of the sub-periods H1, H2 and H3 can be the same, as shown in the example of FIG. 8a, assuring that the DC voltage required in the primary winding 3.1 to obtain the AC voltage required in the corresponding phase can be applied in each of them; or the duration may vary depending on the DC voltage to be applied, where the duration of the sub-periods H1, H2 and H3 may be different and variable. The time period H is preferably kept constant.

Second control technique (explained with respect to a DC conversion into three-phase AC):

In this control technique, for converting DC power to three-phase AC power, the DC voltage which is applied in the primary winding 3.1 is a square wave voltage of period P, said DC voltage comprising in each period P a positive voltage for half of its duration (positive half-cycle) and a negative voltage the rest of the time (negative half-cycle). The controllable switches of the secondary conversion block 2 are controlled such that the terminals corresponding to a phase R, S and T are connected to the corresponding secondary winding 3.2R, 3.2S and 3.2T of the transformer block 3 in the positive half-cycle or in the negative half-cycle of the DC voltage in a given period P, depending on if the corresponding AC voltage to be generated is positive or negative, respectively.

In this case, the DC voltage to be applied in the transformer block 3 is always the same (square wave voltage of period P), with the action on the controllable switches of the secondary conversion block 2 being one that can be adjusted in order to have the required AC voltage of phases R, S and T.

As shown in FIG. 8c, in relation to the voltage in phases R, S and T in the time instant T2 shown in FIG. 7, the controller 4 is configured for controlling the opening and the closing of the controllable switches of the primary conversion block 1 to generate the DC square wave voltage of period P and for controlling the opening and closing of the controllable switches of the secondary conversion block 2:

so that the terminals of the corresponding secondary sub-block 2R, 2S and 2T are connected to the second corresponding winding 3.2R, 3.2S and 3.2T during at least part of the positive half-cycle of the DC voltage in the primary winding 3.1 of the transformer block 3, if a positive voltage of the corresponding phase R, S and T is required; and so that the terminals of the corresponding secondary sub-block 2R, 2S and 2T are connected to the corresponding second winding 32.R, 3.2S and 3.2T during at least part of the negative half-cycle of the DC voltage in the primary winding 3.1 of the transformer block 3, if a negative voltage of the corresponding phase R, S and T is required.

In the second control technique, AC voltage can be generated for two phases simultaneously, unlike what occurred with the first control technique.

In some embodiments of the method, an alternative path associated to at least one controllable switch T1R to T4R of the first switching block 1MS and/or of the second switching block 2MS is provided for a current during a certain time, when said controllable switch T1R to T4R is opened, said alternative path being parallel to said switch T1R to T4R. Each alternative path is provided causing a discharging switch S arranged in said path to be opened with a delay in respect of the opening of the corresponding switch T1R to T4R, as described for the system 100 of the invention, the alternative path being provided from the opening of the controllable switch to the opening of its associated discharging switch S. The value of said delay being the certain time.

Figure 10:
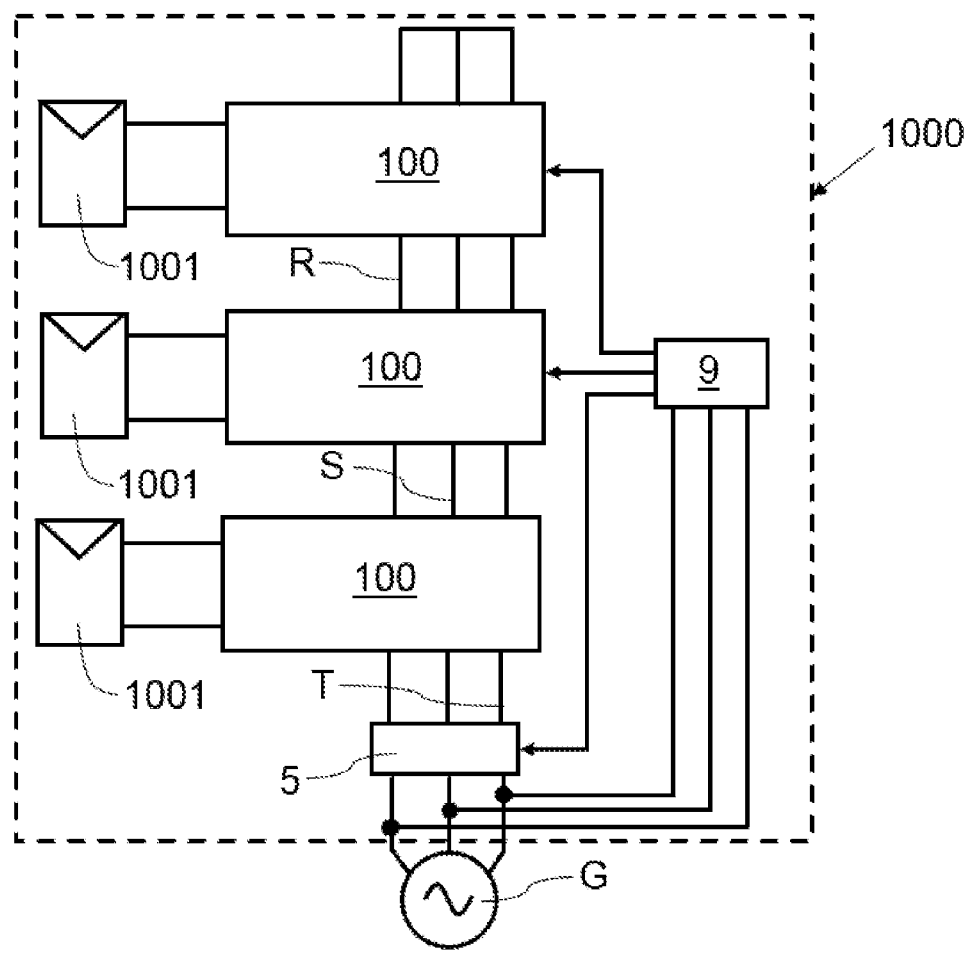
FIG. 10 schematically shows an embodiment of an electrical power conversion installation according to the invention, with three electrical power conversion systems connected in series.

Another aspect of the invention relates to an electrical power conversion installation 1000, comprising a plurality of conversion systems 100 like the one discussed (in any of its configurations and/or embodiments). In the example shown in FIG. 10, the installation comprises three systems 100 connected to each other. In contrast to the system disclosed in US2013/0314948A1, the configuration of the system 100 described before, in any of the possible combinations, allows to connect a plurality of such systems 100 in series, and, therefore, a high-voltage installation is achieved. The installation 1000 of FIG. 10 comprises a first system 100, an intermediate system 100 and a last system 100. For the connection in series, the first three terminals of the secondary conversion block 2 of the first system 100 are star-connected to one another, and the first terminal of each phase R, S and T of the rest of the systems 100 is connected to the second terminal of the corresponding phase R, S and T of the preceding system 100. Therefore, the three second terminals (one associated with each phase R, S, and T) of the last system 100 are free (not connected) to enable being coupled to wherever they may be required.

The configuration of each of the systems 100 allows short-circuiting it, as already described. That is particularly advantageous when a system 100 fails, for example, since by short-circuiting the installation 1000 it can continue to work with the rest of the systems 100. The only implication that must be considered in the installation 1000 is that the voltage which may be generated by the system 100 that is failing must now be provided by the rest of the systems 100, in addition to the voltage that each of them was already providing.

Preferably, the installation 1000 is suitable for being coupled to a power grid G, the second terminals of the last system 100 thereby being suitable for enabling coupling to a power grid G. In some embodiments, the installation 1000 further comprises a filter 5 connected to said second terminals, said second terminals thereby being connected to said power grid G through the filter 5. In other embodiments not shown in Figures, in addition to said filter 5 arranged in that way, the installation 1000 comprises a filter 5 arranged between two contiguous systems 100, one system 100 being connected to another through a filter 5. A filter 5 is configured for reducing or eliminating the high-frequency harmonics content of the three-phase AC voltage.

The installation 1000 further comprises a general controller 9 in charge of control of the currents and of the active and reactive power of the installation 1000 to the power grid G, communicated with the controllers 4 of all the systems 100 comprised in said installation 1000, which is configured for receiving external instructions (from the plant controller, for example, with the conversion requirements) and to cause the controllers 4 to control the controllable switches of the two conversion blocks 1 and 2 taking said external instructions into account. Said general controller 9 is furthermore configured for causing all the controllers 4 to perform their control operations in a coordinated manner. The general controller 9 can furthermore be configured for receiving measurements taken in the power grid G (voltage and current, for example), and for also considering said measurements when controlling the controllers 4. The control to be performed by said controllers 4 can thereby be adapted, for example, if it detects modifications in the power grid G.

A method like the one described above (in any of its embodiments and/or configurations) can be implemented in each system 100 of the installation 1000, with all the controllers 4 following the guidelines established by the general controller 9.

The installation 1000 is preferably a photovoltaic installation and comprises a plurality of solar panels 1001 coupled to the systems 100, particularly to terminals DC1 and DC2 of the DC side of said systems. Each system 100 can comprise one photovoltaic panel 1001 coupled thereto, or a plurality of them.

The invention claimed is:

1. An electrical power conversion system configured for converting three-phase AC power to DC power and DC power to three-phase AC power, comprising:
    a controller;
    a DC side with a positive terminal (DC1) and a negative terminal (DC2);
    an AC side with a first terminal and a second terminal for each of the three phases (R, S, T);
    a primary conversion block (1);
    a secondary conversion block (2); and a transformer block (3) comprising at least one primary winding (3.1) connected to the primary conversion block (1) and three secondary windings (3.2R, 3.2S, 3.2T) connected to the secondary conversion block (2), each secondary winding (3.2R, 3.2S, 3.2T) being associated with a respective AC phase (R, S, T), wherein:

the primary conversion block (1) comprises the positive terminal (DC1) and the negative terminal (DC2) of the DC side and a plurality of controllable switches to enable controlling a flow of electrical power between the positive terminal and the negative terminal and the transformer block (3), the secondary conversion block (2) comprises the first terminal and the second terminal of the AC side per phase (R, S, T) and the plurality of controllable switches associated with each phase (R, S, T) to enable controlling the flow of electrical power, in each case, between corresponding terminals and the transformer block (3), the controller (4) communicates with the controllable switches of the primary conversion block and the secondary conversion block and configured to cause opening and closing of said switches in a controlled and coordinated manner to perform power conversion, the secondary conversion block (2) comprises a secondary sub-block (2S, 2R, 2T) for each of the phases (R, S, T), each secondary sub-block (2S, 2R, 2T) comprising a first output terminal and a second output terminal for a corresponding phase (R, S, T) and the plurality of controllable switches communicated with the controller (4), the each secondary sub-block (2S, 2R, 2T) being connected to a respective secondary winding (3.2R, 3.2S, 3.2T) of the transformer block (3), each of the secondary windings (3.2R, 3.2S, 3.2T) of the transformer block (3) comprising a first end connected to the first output terminal of a corresponding secondary sub-block (2R, 2S, 2T) and a second end connected to the second output terminal of said corresponding secondary sub-block (2R, 2S, 2T), the each secondary sub-block (2R, 2S, 2T) comprising a first switching block (1MS) which is connected to a corresponding secondary winding (3.2R, 3.2S, 3.2T) of the transformer block (3) and to at least one of the first or second output terminals of said secondary sub-block (2R, 2S, 2T) and comprising at least one controllable switch communicated with the controller (4), and a second switching block (2MS) comprising at least one controllable switch communicated with the controller (4), and the second switching block (2MS) is connected between the first output terminal and the second output terminal of said secondary sub-block (2R, 2S, 2T) and comprises a first end that is directly connected to the first output terminal of said secondary sub-block (2R, 2S, 2T) and a second end that is directly connected to the second output terminal of said secondary sub-block (2R, 2S, 2T), wherein the first switching block is configured to isolate the secondary winding from the first output terminal and second output terminal when in an open state and the secondary switching block is configured to short circuit the first output terminal and second output terminal when in a closed state, wherein the first terminal and the second terminal of the secondary sub-block are output terminals.

2. The electrical power conversion system according to claim 1, wherein the first switching block (1MS) of at least one secondary sub-block (2R, 2S, 2T) comprises a configuration selected at least between a first configuration wherein said first switching block (1MS) comprises a first switch (T1R) with an antiparallel diode, connected between the first end of the corresponding secondary winding (3.2R, 3.2S, 3.2T) of the transformer block (3) and the first terminal of said secondary sub-block (2R, 2S, 2T), and a second switch (T4R) with an antiparallel diode, connected between the second end of the corresponding secondary winding (3.2R, 3.2S, 3.2T) of said transformer block (3) and the second terminal of said secondary sub-block (2R, 2S, 2T), a second configuration wherein said first switching block (1MS) comprises a bi-directional switch with an antiparallel diode, connected between the first end of the corresponding secondary winding (3.2R, 3.2S, 3.2T) of the transformer block (3) and the first terminal of said secondary sub-block (2R, 2S, 2T), and a third configuration wherein said first switching block (1MS) comprises a bi-directional switch with an antiparallel diode, connected between the second end of the corresponding secondary winding (3.2R, 3.2S, 3.2T) of the transformer block (3) and the second terminal of said secondary sub-block (2R, 2S, 2T).

3. The electrical power conversion system according to claim 1, wherein the second switching block (2MS) of at least one secondary sub-block (2R, 2S, 2T) is configured with a first configuration comprising a bi-directional switch with an antiparallel diode; or is configured with a second configuration comprising two switches (T2R, T3R) connected in anti-series, each switch (T2R, T3R) comprising an antiparallel diode.

4. The electrical power conversion system according to claim 3, wherein the at least one secondary sub-block (2R, 2S, 2T) comprises at least one discharging circuit (2RD; 2RD') associated to at least one of the controllable switches of the first switching block (1MS) and/or the second switching block (2MS), for protecting said controllable switch from overvoltage, said discharging circuit (2RD; 2RD') being configured for providing an electrical path for a current passing through the corresponding controllable switch when said controllable switch switches to open state.

5. The electrical power conversion system according to claim 4, wherein the first switching block (1MS) of the at least one secondary sub-block (2R, 2S, 2T) is configured with the first configuration, said first switching block (1MS) comprising a first controllable switch (T1R) and a second controllable switch (T4R), the discharging circuit (2RD) comprising at least one discharging sub-circuit (2RDa1, 2RDa4) connected in parallel to one of said controllable switched (T1R, T4R), the discharging circuit (2RD) preferably comprising a second discharging sub-circuit (2RDa1, 2RDa4) connected in parallel to the other controllable switched (T1R, T4R).

6. The electrical power conversion system according to claim 5, wherein each discharging sub-circuit (2RDa1, 2RDa2, 2RDa3, 2RDa4) comprises a controllable discharging switch (S), the controller (4) being communicated with said discharging switch (S) and being configured for synchronously control said discharging switch (S) and the corresponding controllable switch (T1R, T2R, T3R, T4R) to which said discharging sub-circuit (2RDa1, 2RDa2, 2RDa3, 2RDa4) is connected in parallel.

7. The electrical power conversion system according to claim 6, wherein each discharging sub-circuit (2RDa1, 2RDa2, 2RDa3, 2RDa4) comprises the controllable discharging switch (S), a capacitor (C) and a diode (D) in series connection, and a resistor (R) connected in parallel with the capacitor (C).

8. The electrical power conversion system according to claim 4, wherein the second switching block (2MS) of the at least one secondary sub-block (2R, 2S, 2T) is configured with the second configuration, said second switching block (2MS) comprising a first controllable switch (T2R) and a second controllable switch (T3R), the discharging circuit (2RD) comprising at least one discharging sub-circuit (2RDa2, 2RDa3) connected in parallel to one of said controllable switched (T2R, T3R), the discharging circuit (2RD) preferably comprising the second discharging sub-circuit (2RDa2, 2RDa3) connected in parallel to the other controllable switched (T2R, T3R).

9. The electrical power conversion system according to claim 4, wherein the first switching block (1MS) of the at least one secondary sub-block (2R, 2S, 2T) is configured with the first configuration, said first switching block (1MS) comprising a first controllable switch (T1R) and a second controllable switch (T4R), the discharging circuit (2RD') associated to said first switching block (1MS) comprising a first diode (1DD) for the first switch (T1R) of the first switching block (1MS) and a second diode (2DD) for the second controllable switch (T4R) of the first switching block (1MS), both diodes (1DD, 2DD) being connected to each other in a connection point (2RDM) and forming a branch connected in parallel to the corresponding secondary winding (3.2R, 3.2S, 3.2T) of the transformer (3), an anode of each diode (1DD, 2DD) being connected to the collector or drain of the corresponding switch (T1R, T4R) and a cathode of both diodes (1DD, 2DD) being connected to each other in the connection point (2RDM), each discharging circuit (2RD') further comprising a capacitor (1CD) with a first end connected to the connection point (2RDM) and a second end connected to the second switching block (2MS).

10. The electrical power conversion system according to claim 9, wherein the second switching block (2MS) of said secondary sub-block (2R, 2S, 2T) is configured with the second configuration and comprises two switches (T2R, T3R) connected in anti-series by means of a respective midpoint (M2MS), the second end of the capacitor (1CD) of a corresponding discharging circuit (2RD) being connected to said midpoint (M2MS).

11. The electrical power conversion system according to claim 1, wherein the transformer block (3) comprises a transformer (3.0) with a primary winding (3.1) and the three secondary windings (3.2R, 3.2S, 3.2T).

12. The electrical power conversion system according to claim 1, wherein the transformer block (3) comprises three transformers (3.0), each transformer comprising a secondary winding for each phase (R, S, T) and a primary winding, the three primary windings being connected in parallel.

13. The electrical power conversion system according to claim 12, wherein the primary conversion block (1) comprises three conversion sub-blocks (1.1, 1.2, 1.3), each of said conversion sub-blocks (1.1, 1.2, 1.3) being connected to a respective primary winding (3.1) of the transformer block (3), each of said conversion sub-blocks (1.1, 1.2, 1.3) comprising a positive terminal and a negative terminal by means of which said conversion sub-blocks (1.1, 1.2, 1.3) are connected in parallel.

14. The electrical power conversion installation according to claim 1, wherein the transformer block (3) comprises a number of primary windings (3.1) equal to a number of primary ports, a primary port being coupled to the primary conversion block (1) to receive the AC voltage from said primary conversion block (1), all the primary ports being connected such that they are configured for receiving the same AC voltage from said primary conversion block (1).

15. A method for controlling an electrical power conversion system according to claim 1, wherein the opening and closing of the switches of the two conversion blocks (1, 2) are caused in the controlled and coordinated manner by means of the controller (4) for converting DC electrical power to AC electrical power or for converting three-phase AC electrical power to DC electrical power.

16. The method according to claim 15, wherein in order to have a positive voltage between the terminals corresponding to an AC phase (R, S, T), positive voltage is applied to the primary winding (3.1) of the transformer (3), the closing of the switch, or switches, of the first switching block (1MS) of the corresponding secondary sub-block (2R, 2S, 2T) is caused, and the opening of the switch, or switches, of the second switching block (2MS) of said secondary sub-block (2R, 2S, 2T) is caused.

17. The method according to claim 15, wherein in order to have a negative voltage between the terminals corresponding to a phase (R, S, T), the negative voltage is applied to the primary winding (3.1) of the transformer (3), the closing of the switch, or switches, of the first switching block (1MS) of the corresponding secondary sub-block (2R, 2S, 2T) is caused, and the opening of the switch, or switches, of the second switching block (2MS) of said secondary sub-block (2R, 2S, 2T) is caused.

18. The method according to claim 15, wherein in order to have a voltage equal to zero between the terminals corresponding to a phase (R, S, T) or between the terminals of the primary conversion block (1), a short-circuit of the primary winding (3.1) of the transformer block (3) is caused, the opening of the switch, or switches, of the first switching block (1MS) of said secondary sub-block (2R, 2S, 2T) is caused, and the closing of the switch, or switches, of the second switching block (2MS) of said secondary sub-block (2R, 2S, 2T) is caused.

19. The method according to claim 15, wherein for converting DC power to three-phase AC power, a DC voltage to be applied in the primary winding (3.1) of the transformer block (3) is divided into time periods (H) of a given duration, each time period (H) is divided into three sequential sub-periods (H1, H2, H3), and a respective sub-period (H1, H2, H3) is assigned to each phase (R, S, T), in each case connecting the terminals of the secondary conversion block (2) corresponding to said phase (R, S, T) to the corresponding secondary winding (3.2R, 3.2S, 3.2T) of the transformer block (3), with the mean voltage applied to the primary winding (3.1) of the transformer block (3) in each time period interval (H) being equal to zero.

20. The method according to claim 15, wherein for converting DC power to three-phase AC voltage, a DC voltage which is applied in the primary winding (3.1) of the transformer block (3) is a square wave voltage of period (P), said period (P) comprising a positive voltage for half of its duration and a negative voltage the rest of the time, the controllable switches of the secondary conversion block (2) being controlled such that the terminals corresponding to a phase (R, S, T) are connected to the corresponding secondary winding (3.2R, 3.2S, 3.2T) of the transformer block (3) in the positive half-cycle or in the negative half-cycle of the DC voltage in the periods (P), depending on if the corresponding AC voltage to be generated is positive or negative, respectively.

21. The method according to claim 15, wherein an alternative path associated to at least one controllable switch (T1R, T2R, T3R, T4R) of the first switching block (1MS) and/or the second switching block (2MS) of at least one secondary sub-blocks (2R, 2S, 2T) is provided for a current during a certain time, when said controllable switch (T1R, T2R, T3R, T4R) is opened, said alternative path being parallel to said controllable switch (T1R, T2R, T3R, T4R).

22. The method according to claim 21, wherein the alternative path is provided causing a discharging switch (S) arranged in said path to be opened with a delay in respect of the opening of the corresponding switch (T1R, T2R, T3R, T4R), a value of said delay being the certain time.

23. An electrical power conversion installation, wherein it comprises a plurality of conversion systems (100) according to claim 1 connected in series, three first terminals of the conversion block secondary (2) of a first system (100) being star-connected to one another, and the first terminal associated with each AC phase (R, S, T) of the rest of the systems (100) being connected to the second terminal of the corresponding phase (R, S, T) of the preceding system (100).

24. The electrical power conversion installation according to claim 23, comprising a filter (5) connected to the second terminals of the secondary sub-blocks (2R, 2S, 2T) of the last system (100), said filter (5) being configured for reducing or eliminating the high-frequency harmonics content and said filter (5) comprising a connection for the connection thereof to said second terminals and a connection for the connection thereof to a power grid (G).

25. The electrical power conversion installation according to claim 23, comprising a filter for each system (100) connected to the second terminals of each of the secondary sub-blocks (2R, 2S, 2T), one system (100) being connected to the preceding system (100) through a corresponding distributed filter.

26. The electrical power conversion installation according to claim 23, comprising a general controller (9) communicated with the controllers (4) of all the systems (100) comprised in said installation (1000), which is configured for receiving external instructions, to cause the controllers (4) to control the controllable switches of the two corresponding conversion blocks (1, 2) based on said external instructions, and to cause all the controllers (4) to perform their control operations in a coordinated manner.

27. The electrical power conversion installation according to claim 23, comprising at least one photovoltaic panel (1001) coupled to the DC terminals (DC1, DC2) of each system (100), the installation (1000) thereby being a photovoltaic installation.

* * * * *